United States Patent [19]
Puskas

[11] 3,755,236
[45] Aug. 28, 1973

[54] COPOLYMERS OF VINYLSULFONIC ACID SALTS AND ALLYLSULFONIC ACID SALTS
[75] Inventor: Joseph Emil Puskas, Yardville, N.J.
[73] Assignee: Sybron Corporation, Rochester, N.Y.
[22] Filed: Dec. 10, 1971
[21] Appl. No.: 206,858

[52] U.S. Cl.................. 260/29.65 Q, 260/79.3 MU
[51] Int. Cl........................ C08f 15/02, C08f 37/00
[58] Field of Search ............ 260/29.6 SQ, 79.3 MU

[56] References Cited
FOREIGN PATENTS OR APPLICATIONS
842,048   6/1952   Germany Primary Examiner—Melvin Goldstein
Attorney—Theodore B. Roessel

[57] ABSTRACT

New copolymers have been prepared from the salts of ethenesulfonic acid and the salts of 2-propene-1-sulfonic acid by solution polymerization methods such as batch or delay. The copolymers have been found useful as dispersants for the clays used in paper coating and in latex stabilization.

10 Claims, No Drawings

COPOLYMERS OF VINYLSULFONIC ACID SALTS AND ALLYLSULFONIC ACID SALTS

BACKGROUND OF THE INVENTION

This invention relates to new copolymer compositions of at least two sulfonic acid salts, and more particularly, relates to copolymers of salts of ethenesulfonic acid and salts of 2-propene-1-sulfonic acid. As used herein ethenesulfonic acid, vinylsulfonic acid and ethylenesulfonic acid may be used interchangeably, and 2-propene-1-sulfonic acid and allylsulfonic acid may be used interchangeably. Furthermore, the salt may be designated as ethenesulfonic acid salt, allylsulfonic acid salt, and the like, or may be designated as the corresponding sulfonates, such as, sodium allylsulfonate, potassium vinylsulfonate and the like.

Vinylsulfonic acids have been polymerized to translucent, colorless polymers in U. S. Pat. No. 2,515,714. The polymerization disclosed therein is carried out with monomer free of impurities in the absence of oxygen to render the homopolymers formed thereby colorless. Homopolymers and copolymers of sodium ethylene sulfonate are disclosed by Breslow and Kutner in J. Polymer Science XXVII, 295-312 (1958). Breslow and Kutner form copolymers of sodium ethylene sulfonate and acrylamide, sodium ethylene sulfonate and N-allylacrylamide, sodium ethylene sulfonate and acrylic acid, sodium ethylene sulfonate and methacrylic acid, sodium ethylene sulfonate and acrylonitrile and sodium ethylene sulfonate and sodium acrylate. Breslow and Kutner report that no copolymers could be prepared with sodium ethylene sulfonate and butadiene, isobutylene, styrene, alpha-methylstyrene, n-butyl vinyl ether, allyl alcohol, N-allylacetamide, maleic acid or fumaric acid. Sodium ethylene sulfonate is disclosed as a typical sulfonated olefin monomer in U. S. Pat. No. 3,415,870 where it is indicated that such monomers are primarily employed in the preparation of homopolymers and copolymers with other functional monomers.

In U. S. Pat. No. 2,974,123 and U. S. Pat. No. 2,527,300 the alkali metal salts of both ethylenesulfonic acid and allylsulfonic acid are used as monomers in forming copolymers with other monomeric materials. Copolymers of acrylonitrile and the alkali metal salts of ethylene-sulfonic acid and acrylonitrile and the alkali metal salts of allylsulfonic acid are prepared in U. S. Pat. No. 2,974,123. In U.S. Pat. No. 2,527,300 the sodium or potassium salt of ethylenesulfonic acid or 2-propenesulfonic acid are polymerized with a polymerizable poly-unsaturated organic material to form a copolymer suitable for a water-insoluble cation exchange resin.

Copolymers of a salt of a 3-4 carbon allylic sulfonic acid and vinyl esters of a carboxylic acid such as, vinyl acetate, vinyl formate, vinyl propionate or vinyl butyrate, have been prepared in U. S. Pat. No. 2,834,759.

Thus, copolymers of the salts of ethylenesulfonic acid and acrylamide, N-allylacrylamide, acrylic acid, methacrylic acid, acrylonitrile, or sodium acrylate have been prepared. Copolymers of the salts of allylsulfonic acid and vinyl esters of a carboxylic acid or polymerizable poly-unsaturated materials have also been prepared. However, copolymers of the salts of ethylene sulfonic acid and the salts of allylsulfonic acid have not been prepared heretofor.

OBJECTS OF THE INVENTION

Accordingly, it the main object of this invention to provide a copolymer of the salts of ethylenesulfonic acid and the salts of allylsulfonic acid.

Although homopolymers of sodium salts of ethylenesulfonic acid are useful as dispersants, for example, as dispersants for clay in an aqueous medium, their use is limited by the expense of the monomeric material. Monomeric sodium allylsulfonate is considerably less expensive than sodium ethylenesulfonate, but it does not homopolymerize by the free radical mechanism (pages 172-173 "Principles of Polymer Chemistry" by P. J. Flory, Cornell University Press [1953]). A polymeric material having the dispersant function of the homopolymer of sodium ethylene-sulfonate and the economic advantage of sodium allylsulfonate is highly desirable.

Accordingly, it is an object of this invention to provide an economical polymeric material of ethylenesulfonate salts which is useful as a dispersant.

Other objects of the present invention and advantageous features thereof will become apparent to those skilled in the art.

SUMMARY OF THE INVENTION

It has been found that highly desirable water-soluble dispersing agents can be obtained by copolymerizing vinylsulfonate salts and allylsulfonate salts. The copolymers of this invention are obtained by the copolymerization of these salts in a weight ratio of vinylsulfonate salts to allylic sulfonate salts of between about 95:5 and 25:75.

The copolymers of this invention, preferably in the form of an aqueous solution, are a hygroscopic crystalline material and may be represented by the following structural formula:

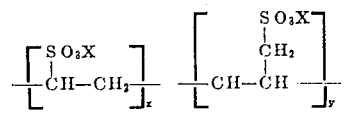

wherein X is a cation selected from the group consisting of alkali metal, alkaline earth metal and ammonium, and the weight ratio of $x$ to $y$ is between about 95:5 and 25:75. A particularly preferred embodiment of the invention is the sodium vinylsulfonate/sodium allylsulfonate copolymer having a weight ratio of between about 40:60 and 60:40.

The cation, X, is suitably one such that the copolymer containing sulfonate groups is water soluble. The copolymer may be in the form of such salts as sodium, potassium, magnesium, calcium, barium, ammonium, or the like, and mixtures thereof. The viscosity of the copolymers obtained during the polymerization in either water or an inert, inactive liquid medium is dependent upon the amount of water or other inactive, inert liquid medium used in the reaction mixture, but it is preferred that the viscosity of the aqueous copolymer of the present invention fall within the range of about 2.25 cst. to 4.50 cst at 30°C.

The vinylsulfonic acid salt and the allylsulfonic acid salt are copolymerized in solution by free radical initiators.

DESCRIPTION OF THE PREFERRED EMBODIMENT

The copolymers formed in accordance with the present invention preferably remain in the aqueous solution in which they are prepared. However, when the copolymers are isolated from the solution in which they are prepared, they are isolated in the form of hygroscopic crystals. The crystalline form of the copolymers may be prepared by techniques known in the art, such as, precipitation from the aqueous solution with an alcohol, e.g., methanol, or by evaporation of the water from the aqueous solution, or by freeze drying.

Although the preferred form of the copolymers of the present invention is the sodium salt of the vinylsulfonic acid and the sodium salt of allylsulfonic acid, the potassium salts, barium salts, calcium salts and ammonium salts, or mixtures thereof with each other or with the sodium salts may be easily prepared from the corresponding salts of the monomers or mixtures thereof. Accordingly, the copolymer of the present invention may be prepared from the alkali metal salts, such as, sodium and potassium, of the corresponding monomers, from the alkaline earth metal salts, such as, barium, magnesium and calcium, of the corresponding monomers, and from the ammonium salts of the corresponding monomers.

Although it is preferred that the weight ratio of the salts of vinylsulfonic acids and the salts of allylsulfonic acids be present in a weight ratio of between about 95:5 and about 25:75, it is possible to prepare copolymers containing proportions of the salts of vinylsulfonic acid and the salts of allylsulfonic acid in proportions greater than 95 parts by weight of the salts of vinylsulfonic acid and less than 5 parts by weight of the allyl sulfonic acid. It is particularly preferred that the salts of vinylsulfonic acid and the salts of allylsulfonic acid be present in the water-soluble copolymer in a weight ratio of between about 40:60 and 60:40. Copolymer compositions containing greater than about 70 parts by weight of the salts of allylsulfonic acid are difficult to prepare due to the difficulty in initiating the copolymerization reaction, resulting in the failure of substantial portions of the monomers to copolymerize and causing a substantial portion of the monomers to remain unpolymerized.

The conversion of the monomers to the copolymers of the present invention can be monitored by titrating the reaction mixture or the product for the presence of unsaturation (double bonds) with Wy's solution by using techniques and solutions well-known in the art. The disappearance of the double bonds or unsaturation and the increase in the kinematic viscosity of the solution are taken as an indication of copolymer formation.

The copolymerization of the salts of vinylsulfonic acid and the salts of allylsulfonic acid may be carried out by the usual solution polymerization methods, such as, batch or delay, well-known to those skilled in the art. When proportions of the sulfonate monomers of the present invention are used within the ranges disclosed herein, titration with Wy's solution indicates that upon completion of the copolymerization only about 1–2 percent unsaturation remains in the reaction mixture. Accordingly, nearly all of the monomer used in the formation of the copolymer is converted to copolymer.

The copolymers of the present invention have relatively low molecular weights and accordingly, are water-soluble. Furthermore, since all units of the monomer structure contain sulfonate groups, the compounds remain extremely polar, a factor which contributes to water solubility of the copolymer. Thus, the copolymerization of a sulfonate monomer of the present invention with another sulfonate monomer of the present invention produces a low molecular weight, water-soluble copolymer.

Combinations or mixtures of the sulfonate monomers may be prepared in accordance with the present invention, for example, the sodium salt of vinylsulfonic acid may be copolymerized with the calcium salt of allylsulfonic acid; a mixture of the sodium and potassium salts of vinylsulfonic acid may be copolymerized with a mixture of the sodium and potassium salts of allylsulfonic acid; a mixture of sodium and ammonium salts of vinylsulfonic acid may be copolymerized with the calcium salt of allylsulfonic acid; and the like. It is within the purview of one skilled in the art to employ mixtures of the various sulfonate salts to form the copolymers of the present invention.

Since standard polymerization techniques are used to prepare the copolymers of the present invention, one skilled in the art may select proper catalyst, polymerization medium and other polymerization additives to prepare the copolymers of the present invention. Potassium persulfate is the preferred catalyst, however, other free radical generating catalysts, such as, ammonium persulfate and sodium persulfate, peroxy catalysts such as, hydrogen peroxide and benzoyl peroxide including combinations of a peroxide with a reducing agent, and the like, may be used in the polymerization reaction. Azonitrile catalysts may also be used as initiators. The polymerization is usually carried out in a homogeneous system. The reaction may be carried out in any medium which will not adversely effect the formation of the copolymers. For example, the polymerization may be carried out in water, dimethylsulfoxide, and other solvents which will not react with the copolymer or monomers or result in the inhibition of the polymerization reaction by the free radical mechanism, and such polymerization is referred to herein as a solution polymerization.

The copolymer is generally prepared in an aqueous medium and preferably has a solids content of 20–40 percent solids. The solids content as used herein refers to total solids and includes the copolymer, sodium sulfate, chlorides, catalyst fragments, and the like. It is deemed within the skill of one in the art to adjust the reaction proportions and conditions to vary the solids content of the reaction mixture and product formed therein.

In the preferred polymerization method of the present invention 25 percent of the vinylsulfonate salt in water and 25 percent of the allylsulfonate salt in water are mixed in the presence of a sufficient amount of a free radical catalyst. By a sufficient amount of free radical catalyst is meant that amount of catalyst required to promote the copolymerization of the monomeric materials, an amount which can be determined by one skilled in the art. The concentration of the allylsulfonate salt and vinylsulfonate salt which can be added to the reaction mixture, may be from about 5 percent to about 70 percent of active monomer, the remainder of the material being water or any other inactive, inert solvent suitable for carrying out the reaction. Accordingly, the term "active vinylsulfonate salt" or "active allylsulfonate salt" is used herein to designate the concentration of the allylsulfonate salt or vinylsulfonate salt in either water or other inert, inactive solvents. The maximum concentration of monomer in water or other inert, inactive medium is generally limited to the amount of monomer which may be added to the medium before precipitation of the monomer occurs.

The time and temperature of polymerization are interdependent variables and are generally selected with regard to the temperature chosen and the activity of the initiator at that particular temperature. The polymerizations are usually carried out at temperatures of about 20°–100° C for about 2 to 24 hours or longer. It is preferred that the reaction be carried out under nitrogen or other inert atmosphere at temperatures ranging from about 45°–85° C. depending upon the catalyst used in the reaction mixture. Thus, when potassium persulfate is used as the catalyst, it is preferred that the reaction temperature be from about 55° C. It is generally preferred that the maximum reaction temperature not exceed the boiling point of the mixture of monomers in water or other inert, inactive medium. The reaction must be carried out for at least 2 hours, and it is preferred that when potassium persulfate is used as the catalyst at a batch temperature of 80° C., that the reaction be carried out for approximately 6–7 hrs. The length of time at which the reaction is maintained at an elevated temperature can be determined by one skilled in the art.

The invention is illustrated by, but not limited to, the following examples.

EXAMPLES

The properties of the monomers used in the examples of the present invention are set forth below:

Sodium vinylsulfonate
  Assay, %                           25 min.
  Solids, %                          35± 1
  Density, g/ml                      1.20±0.02
  Kinematic Viscostiy (30°C), cst    1.60
  Principal Impurities               Sodium isethionate
                                     Sodium sulfonate Sodium allylsulfonate
  Assay, %                           26.6
  Solids, %                          42.7
  Density, g/ml                      1.27
  Kinematic Viscosity (30°C.),cst    2.66
  Principle Imurity                  Sodium chloride

EXAMPLE 1

Five hundred grams of 25 percent active sodium vinylsulfonate (in water), 500 grams of 25 percent active sodium allylsulfonate (in water), and 1.8 grams potassium persulfate ($K_2S_2O_8$) were placed in a 1-liter, 3-neck flask equipped with stirrer, condenser, heating mantle, thermometer, and nitrogen inlet. The batch temperature was raised to 80° C under a nitrogen blanket and 1.8 grams of $K_2S_2O_8$ per hour were added for 6 hours. After seven hours, the batch was cooled. The water-soluble 50:50 (sodium vinylsulfonate [SVS]:sodium allylsufonate [SAS]) weight ratio copolymer had the following properties:

Color                        pale yellow
  Solids                       37.5%
  Kinematic Viscosity (30°C)   2.97 cst
  Density                      1.31 g/ml

EXAMPLE 2

Three hundred grams of 25 percent active sodium vinylsulfonate (in water), 700 grams of 25 percent active sodium allylsulfonate (in water) and 1.8 grams $K_2S_2O_8$ were placed in the equipment described in Example 1. The batch temperature was raised to 80° C. under a nitrogen blanket and 1.8 grams of $K_2S_2O_8$ per hour were added for 12 hours. After 13 hours the batch was cooled. The water-soluble 30:70 (SVS:SAS) weight ratio copolymer had the following properties:

Color                        pale yellow
  Solids                       34.0%
  Kinematic Viscosity(30°C)    2.66 cst
  Density                      1.31 g/ml

EXAMPLE 3

Three hundred grams of 25 percent active sodium vinylsulfonate (SVS) (in water), 300 grams of 25 percent active sodium allylsulfonate (SAS) (in water) and 1.8 grams $K_2S_2O_8$ were placed in equipment described in Example 1. The batch temperature was raised to 80° C under a nitrogen blanket and 1.8 grams of $K_2S_2O_8$ per hour were added for 5 hours. The batch was cooled after 6 hours. The water-soluble 70:30 (SVS:SAS) weight ratio copolymer had the following properties:

Color                        pale yellow
  Solids                       36.0 %
  Kinematic Viscosity (30°C)   2.77 cst
  Density                      1.28 g/ml

EXAMPLE 4

One thousand eighty grams of 25 percent active SVS in water and 1.8 grams $K_2S_2O_8$ were placed in equipment described in Example 1. The batch temperature was raised to 80° C under a nitrogen blanket and 1.8 grams of $K_2S_2O_8$ were added at 1 hour intervals for 3 hours. The batch was cooled after 3½ hours. The water-soluble vinylsulfonate homopolymer had the following properties.

Color                        pale yellow
  Solids                       37.0
  Kinematic Viscosity (30°C)   3.34 cst
  Density                      1.25 g/cc.

EXAMPLE 5

Three hundred grams of 25 percent active SVS (in water), 700 grams of 25 percent active SAS (in water) and 1.8 grams $K_2S_2O_8$ were placed in equipment described in Example 1. The batch temperature was raised to 60° C under a nitrogen blanket and 1.8 grams of $K_2S_2O_8$ were added at 1 hour intervals for 5 hours. The batch temperature was then raised to 80° C and $K_2S_2O_8$ addition was continued for 4 hours. The batch was cooled an hour later. The water soluble 30:70 (SVS:SAS) weight ratio copolymer had the following properties:

Color                        pale yellow
  Solids                       37.5%
  Kinematic Viscosity (30°C)   2.68
  Density                      1.27 g/cc

EXAMPLE 6

Seven hundred grams of 25 percent active SVS (in water), 300 grams of 25 percent SAS (in water) and 1.8 grams $K_2S_2O_8$ were placed in equipment described in Example 1. The batch temperature was raised to 60° C under a nitrogen blanket and 1.8 grams of $K_2S_2O_8$ were added at 1 hour intervals for 5 hours. The batch temperature was then raised to 80° C, and 1.8 gram portions of $K_2S_2O_8$ were added for another 2 hours. The batch was cooled an hour later. The resulting water-soluble 70:30 (SVS:SAS) weight ratio copolymer had the following properties:

| | |
|---|---|
| Color | pale yelllow |
| Solids | 37.0% |
| Kinematic Viscosity (30°C) | 3.07 cst |
| Density | 1.27 |

EXAMPLE 7

The dispersing ability of the product was determined by the length of time it could hold clay in suspension. The test was carried out as follows:

Two grams of clay (Hydrogloss 90) were added to 60 cc of demineralized water in a 100 cc graduated cylinder, shaken and permitted to stand 5 minutes. Various concentrations of product were added, diluted with demineralized water to 100 cc, inverted 12 times to mix, and placed against a dark background. A timer was started and stopped when the clay-water interphase reached the 30 cc mark. The time it took the clay to settle from the 100 cc mark to the 30 cc mark was used as a basis for comparison. The table below shows the results of these measurements:

TABLE I

Clay Dispersing Ability Of SVS/SAS Compolymers*

| Sample | SVS:SAS, % | ppm | Time sec. |
|---|---|---|---|
| Blank | no copolymer | | 245 |
| Example 4 | SVS Homopolymer | 0.1 | 305 |
| | | 0.4 | 324 |
| Example 6 | 70:30 | 0.1 | 305 |
| | | 0.4 | 290 |
| Examle 1 | 50:50 | 0.1 | 286 |
| | | 0.4 | 276 |
| Example 5 | 30:70 | 0.1 | 320 |
| | | 0.4 | 319 |

*pH= 5-6
*temperature=ambient

The data in table 1 indicate that the copolymers of the present invention have clay dispersing ability as good as that of the sodium vinylsulfonate homopolymer.

EXAMPLE 8

Nine hundred fifty grams of 25 percent active SVS in water, 50 grams of 25 percent active SAS in water, and 1.8 grams $K_2S_2O_8$ were placed in equipment described in Example 1. The batch temperature was raised to 80° C under a nitrogen blanket and 1.8 grams of $K_2S_2O_8$ were added at 1 hour intervals for 4 hours. The batch was cooled an hour later. The water soluble 5:95 (SVS:SAS) weight ratio copolymer had the following properties:

| | |
|---|---|
| Color | pale yellow |
| Solids | 45.7% |
| pH | 2.7 |
| Viscosity (30°C) | 4.08 centistokes (cst) |
| Density | 1.27 g/cc. |

Titration with Wy's solution showed 1.28 percent unsaturation. Titration of the copolymer products of Examples 1-6 showed from 0.75 to 1.5 percent unsaturation.

The copolymers are water soluble and are obtained in the forms of the salts and generally contain such contaminants or impurites as sodium chloride and sodium sulfate.

The copolymers of the present invention have been found useful as dispersants for clays, such as, the type of clay used for paper coating or as stablizers for latexes.

References to parts, proportions, or percentages refer to parts, proportions, or percentages by weight throughout the specification and claims unless otherwise specified.

The above examples are not meant to limit the scope of the invention or the application to which this invention may be directed. It is to be understood that although the invention has been described with specific reference to particular embodiments thereof, it is not to be so limited, since changes and alterations therein may be made which are in the full intended scope of this invention as defined by the appended claims.

I claim:

1. As a new composition of matter, a water-soluble copolymer having the formula:

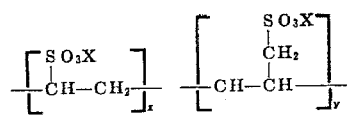

wherein the weight ratio of x to y is between about 95:5 and 25:75 and X is at least one cation selected from the group consisting of alkali metal, alkaline earth metal and ammonium.

2. The composition of claim 1 wherein the weight ratio of $x$ to $y$ is between about 40:60 and 60:40.

3. The composition of claim 1 wherein the alkali metal is selected from the group consisting of sodium and potassium and the alkaline earth metal is selected from the group consisting of barium, magnesium and calcium.

4. Aqueous solution of the copolymers of claim 1.

5. A water-soluble copolymer consisting essentially of salts of vinylsulfonic acid, said salts being selected from the group consisting of the alkali metal salts, the alkaline earth metal salts, the ammonium salt and mixtures thereof, and salts of allylsulfonic acid, said salts being selected from the group consisting of the alkali metal salts, the alkaline earth metal salts, the ammonium salt and mixtures thereof, in which the weight ratio of the salts of vinylsulfonic acid and the salts of allylsulfonic acid is between about 95:5 and 25:75.

6. The copolymer of claim 5 wherein the weight ratio of the salts of vinylsulfonic acid and the salts of allylsulfonic acid is between about 40:60 and 60:40.

7. The copolymer of claim 5 wherein the alkali metal salt is selected from the group consisting of sodium and potassium and the alkaline earth metal salt is selected from the group consisting of barium, magnesium and calcium.

8. Aqueous solution of the copolymers of claim 5.

9. The aqueous solution of claim 8 wherein the weight ratio of the salts of vinylsulfonic acid and the salts of 40:60 acid is between about 40:60 and 60:40.

10. The aqueous solution of claim 8 wherein the alkali metal salt is selected from the group consisting of sodium and potassium, and the alkaline earth metal salt is selected from the group consisting of barium, magnesium and calcium.

* * * * *